No. 825,286. PATENTED JULY 10, 1906.
E. F. W. ALEXANDERSON.
GROUND DETECTOR AND CUT-OUT.
APPLICATION FILED SEPT. 14, 1904.
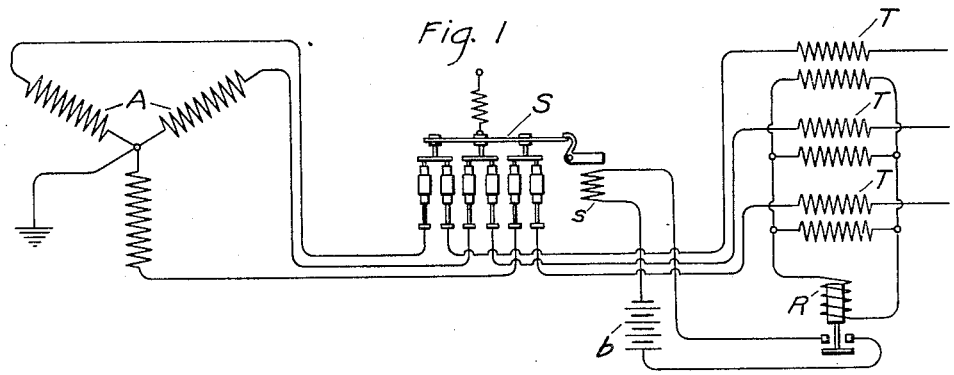
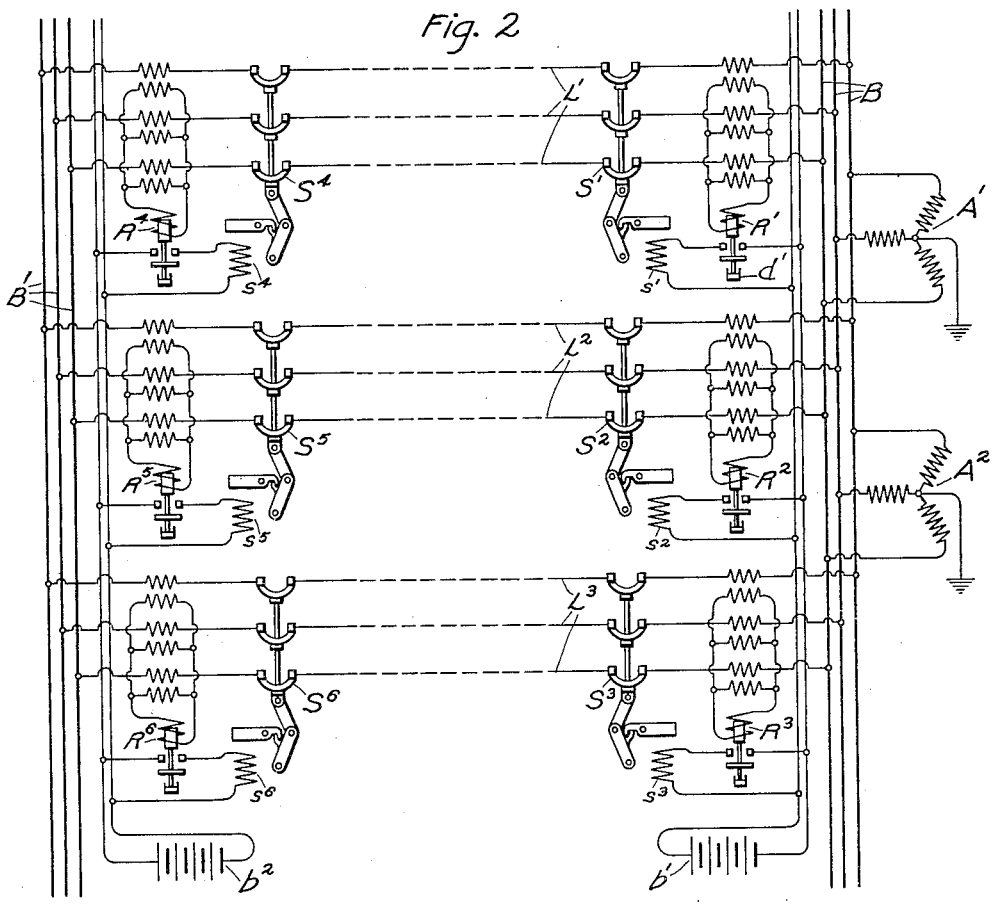
Witnesses:—
Benjamin B. Hine
Helen Orford
Inventor
Ernst F. W. Alexanderson
By Albert G. Davis
Att'y

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

GROUND-DETECTOR AND CUT-OUT.

No. 825,286.   Specification of Letters Patent.   Patented July 10, 1906.

Application filed September 14, 1904. Serial No. 224,359.

*To all whom it may concern:*

Be it known that I, ERNST F. W. ALEXANDERSON, a subject of the King of Sweden and Norway, residing at Schenectady, county of Schenectady, State of New York, have invented certain new and useful Improvements in Ground-Detectors and Cut-Outs, of which the following is a specification.

My invention relates to protection against grounds of three-phase systems having a grounded neutral point; and its object is to provide protective means for detecting grounds or cutting out grounded lines or both, which is more sensitive and reliable than the devices heretofore employed.

It has been customary heretofore to protect against grounds by means of overload devices or static devices. The former of these from their very nature will not respond unless the ground or leakage current is of sufficient amount to overload the lines of the generator or other device which is to be protected, while static devices are for the most part unreliable.

By my invention I provide a protective device for three-phase systems with grounded neutral point, which while possessing the reliability of overload devices will nevertheless respond to a ground or leakage current of an amount which may be as small a fraction of the overload-current as desired. To accomplish this end, I take advantage of the fact that the algebraic sum of the currents at any instant in the three branches of a three-phase system is always equal to zero regardless of whether the load is balanced or not. A device to which is supplied the algebraic sum of the currents in the phases will consequently remain inoperative, no matter how unevenly divided or how great the load may be. In a three-phase system having a grounded neutral point, however, if a conductor of one of the phases becomes grounded a ground or leakage current will flow, which will traverse the conductor of the grounded phase alone, the circuit being completed by the earth instead of by the conductors of the other phases. The balance of the currents in the phases is thus destroyed. A device to which is supplied the algebraic sum of the currents in the three phases will now be energized. Evidently since the device will respond only when a ground exists it may be made as sensitive as desired, so as to operate on a leakage-current equal to a very small fraction only of the full-load current.

My invention will best be understood by reference to the accompanying drawings, in which—

Figure 1 shows diagrammatically a protective arrangement for a three-phase generator with a grounded neutral point arranged in accordance with my invention, and Fig. 2 shows my invention applied to the protection of parallel feeders in a three-phase system with grounded neutral point.

Referring first to Fig. 1, A represents a generator or other source of three-phase alternating current with the neutral point grounded, the circuit of which it is desired to open upon the occurrence of a ground upon any one of the phases. S represents a switch adapted to open the circuit of the generator A, and s represents a tripping-coil for the switch. The series transformers T T T are included in the three phases, and the secondaries of the transformers are all connected in parallel and to the terminals of a relay R. As long as no ground exists upon a conductor of any of the phases the current in the secondary of one of the transformers will be equal and opposite to the algebraic sum of the currents in the secondaries of the other two transformers, and consequently no current will flow through the actuating-coil of relay R. This is true regardless of whether the load on the three phases is balanced or not. Now if one of the conductors of the three phases becomes grounded a circuit will exist comprising the conductor of that phase alone and the earth return, so that the algebraic sum of the currents in the three phases will no longer be zero. The resultant current will consequently flow through the winding of the relay R, which will therefore be energized, so as to draw up its core, closing the circuit of battery b through the tripping-coil s and allowing switch S to open, so as to break the circuit of the generator A.

Referring now to Fig. 2, I have shown my invention applied to the protection of parallel feeders in a three-phase system with grounded neutral point. In this figure, A' and A² represent two generators having their neutral points grounded and connected to the station bus-bars B. B' represents the bus-bars at the receiving end or substation. The generating-station is connected to the substation through the three parallel lines L', L², and L³. These parallel lines or feeders are provided at the generating ends with the relays R', R², and R³, respectively, and at the receiving ends with similar relays R⁴ to R⁶, each relay being energized from a group of series transformers arranged as heretofore described. The relay R' is provided with a dash-pot $d'$, and the other relays are similarly provided, the object being to cause the relays to operate on the well-known inverse-time-element principle, so that the greater the current in the relay-coil the quicker the relay will move. Now assume a ground upon one of the conductors of any one of the three parallel lines. For instance, suppose a ground occurs upon one of the conductors of the line L³. Current will be supplied to the ground directly from the bus-bars B through the line L³ and indirectly through the lines L' and L² and back from the receiving end through line L³ to the ground. The balance of current in the secondaries of each group of series transformers will be destroyed, and each relay-core will start to move. The relative speed with which the cores move will depend somewhat upon the position of the ground on the line L³. Thus, for instance, if the ground in the line L³ occurs very near the generating-station nearly all the leakage-current will flow directly from the generator bus-bars B through line L³ to the ground, and the amount of current flowing to the ground indirectly through the lines L' and L² will be much smaller, owing to the greater resistance of the circuit. The relay-coil R³ will under these circumstances be most strongly energized and will be the first to close, thereby disconnecting line L³ from the bus-bars B. The switches controlled by the relays and connecting the feeders to the bus-bars are shown diagrammatically at S' S², &c. After the line L³ is disconnected from the generator bus-bars B a leakage-current will still flow through lines L' and L² and back through line L³ to the fault. The leakage or fault current in line L³ will be twice as great as in lines L' or L², so that relay-coil R⁶ will be more strongly energized than any of the other four, and consequently will be the first to close, disconnecting the line L³ from the receiving bus-bars B'. The faulty line L³ is thus disconnected at both ends, and the service continues without interruption. On the other hand, if the fault occurs on the line L³ near the receiving bus-bars B', so that the resistance from the generator bus-bars B to the fault is practically the same by way of each of the three lines, the relay R⁶ will be the most strongly energized of all of the relays and will consequently close first, disconnecting the line L³ from the receiving bus-bars B'. The only path for the fault-current is now directly from the generating bus-bars through line L³ to the ground. Relay R³ is consequently the only one that is energized and closes, disconnecting the line L³ from the generating bus-bars B. Thus on line L³ the faulty line alone will be cut out without regard to the position of the fault on the line and without interruption of the service. As explained above, the relays may be arranged to respond to a fault-current very much less than the full-load current, and consequently more adequate protection against grounds is secured than would be possible by the ordinary overload devices.

It is evident that my invention has other applications besides those shown, and consequently I do not desire to limit myself to the particular construction and arrangement of parts shown in the drawings; but I aim in the appended claims to cover all modifications which are within the scope of my invention.

What I claim as new, and desire to secure by Letters Patent of the United States, is—

1. In combination, a three-phase circuit having the neutral point grounded, an electroresponsive device, and means for supplying to said device a current proportional to the algebraic sum of the currents in the three phases.

2. In combination, a three-phase circuit having the neutral point grounded, an electroresponsive device, means for supplying to said device a current proportional to the algebraic sum of the currents in the three phases, and a switch controlled by said device adapted to open said circuit.

3. In combination, a three-phase circuit having the neutral point grounded, a switch adapted to open said circuit, a tripping-coil for said switch, a relay controlling the circuit of said tripping-coil, and means for supplying to said relay a current proportional to the algebraic sum of the currents in the three phases of said circuit.

4. In a three-phase system with grounded neutral point, parallel lines, electroresponsive devices energized respectively by currents proportional to the algebraic sum of the currents in the three phases of the several lines, and switches controlled respectively by the several devices and each adapted to open the circuit of one of said lines at one end thereof.

5. In a three-phase system with grounded neutral point, parallel lines, relays at each end of each line, connections for supplying to each relay a current proportional to the algebraic sum of the currents in the three phases at that end of the line, means controlled by each relay for opening the circuit of the line at that end, and means for retarding the movement of the relays.

In witness whereof I have hereunto set my hand this 10th day of September, 1904.

ERNST F. W. ALEXANDERSON.

Witnesses:
BENJAMIN B. HULL,
HELEN ORFORD.